US006711541B1

United States Patent
Kuhn et al.

(10) Patent No.: US 6,711,541 B1
(45) Date of Patent: Mar. 23, 2004

(54) TECHNIQUE FOR DEVELOPING DISCRIMINATIVE SOUND UNITS FOR SPEECH RECOGNITION AND ALLOPHONE MODELING

(75) Inventors: Roland Kuhn, Santa Barbara, CA (US); Jean-Claude Junqua, Santa Barbara, CA (US); Matteo Contolini, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/390,434

(22) Filed: Sep. 7, 1999

(51) Int. Cl.$^7$ .......................... G10L 15/04; G10L 15/06
(52) U.S. Cl. ..................... 704/242; 704/243; 704/254
(58) Field of Search ................................ 704/236, 237, 704/238, 239, 240, 241, 242, 243, 244, 245, 254, 255, 256

(56) References Cited

U.S. PATENT DOCUMENTS

| | | | | |
|---|---|---|---|---|
| 4,805,219 A | * | 2/1989 | Baker et al. ................. | 704/240 |
| 5,033,087 A | * | 7/1991 | Bahl et al. ................... | 704/245 |
| 5,555,344 A | * | 9/1996 | Zunkler ....................... | 704/231 |
| 5,579,436 A | | 11/1996 | Chou et al. | |
| 5,715,367 A | * | 2/1998 | Gillick et al. ................ | 704/244 |
| 5,729,656 A | * | 3/1998 | Nahamoo et al. ........... | 704/254 |
| 5,806,029 A | | 9/1998 | Buhrke et al. | |
| 5,970,239 A | * | 10/1999 | Bahl et al. ................... | 704/231 |

OTHER PUBLICATIONS

W. Chou and W. Reichl, "Decision tree state tying based on penalized Bayesian information criterion", *Int. Conf. On Acoustics, Speech, and Signal Processing (ICASSP–99)*, V. 1, pp. 345–348, Phoenix, Arizona, 1999.
W. Reichl and W. Chou, "A unified approach of incorporating general features in decision tree based acoustic modeling", *Int. Conf. on Acoustics and Signal Processing (ICASSP–99)*, V. 2, pp. 573–576, Phoenix, Arizona, 1999.
K. Sjölander and J. Högberg, "Using expanded question sets in decision tree clustering for acoustic modeling", *IEEE Workshop on Automatic Speech Recognition and Understanding*, pp. 179–183, Santa Barbara, CA, Dec. 1997.

* cited by examiner

*Primary Examiner*—Vijay Chawan
*Assistant Examiner*—Abul K. Azad
(74) *Attorney, Agent, or Firm*—Harness, Dickey & Pierce, PLC

(57) ABSTRACT

A set of models is developed to represent sound units and these models are then used with the incorrect sound units to determine which generate high likelihood scores. The models generating high likelihood scores for the incorrect sound units represent those that are more likely to be confused. The resulting confusability data may then be used in generating more discriminative speech models and in subsequent pruning of the acoustic decision tree. The confusability data may also be used to develop confusability predictors used for rejection during search and in developing continuous speech recognition models that are optimized to minimize confusability.

13 Claims, 7 Drawing Sheets

Prior Art (x = acoustic tree leaf)

Military (x = acoustic tree leaf)

TECHNIQUE FOR DEVELOPING DISCRIMINATIVE SOUND UNITS FOR SPEECH RECOGNITION AND ALLOPHONE MODELING

BACKGROUND AND SUMMARY OF THE INVENTION

The present invention relates generally to speech recognition and, more particularly, to a technique for estimating confusability among sound units which can be used for constructing decision trees associated with allophone models, for confusability rejection modeling and for sound unit clustering.

Automated speech recognition has made significant strides, and yet this technology still falls far short of what a human can do with relative ease. One particularly difficult problem involves confusability among sound units. A typical speech recognition system models speech in terms of sound units, such as phonemes, syllables, words, or the like. Depending on the system configuration, there can be many sound units, each having many possible subtle variations, depending on where the sound unit occurs within the context of a spoken utterance. Certain sound units are frequently confused with other sound units, causing recognition errors. Whereas the human listener can usually discriminate among confusable sound units, the speech recognition system may have great difficulty.

In an effort to improve discrimination among confusable sound units, it would be desirable to develop the recognition system so that more processing power is devoted to situations where confusion is likely. The present invention addresses this need. As will be more fully explained, the technique employs a procedure whereby for each example of a given sound unit a set of models representing other sound units (i.e., incorrect sound units) are used to calculate a likelihood score. The incorrect models generating high likelihood scores for this example represent those most likely to lead to recognition error.

The resulting confusability data generated through the above analysis may be used in a variety of ways. The data may be used to develop decision trees for allophone modeling. The data may also be used to develop confusability predictors used for rejection during search. The data may also be used in developing continuous speech recognition models that are optimized to minimize confusability.

For a more complete understanding of the invention, its objects and advantages, refer to the following specification and to the accompanying drawings.

DETAILED DESCRIPTION OF THE PREFERRED EMBODIMENTS

Figure 1:
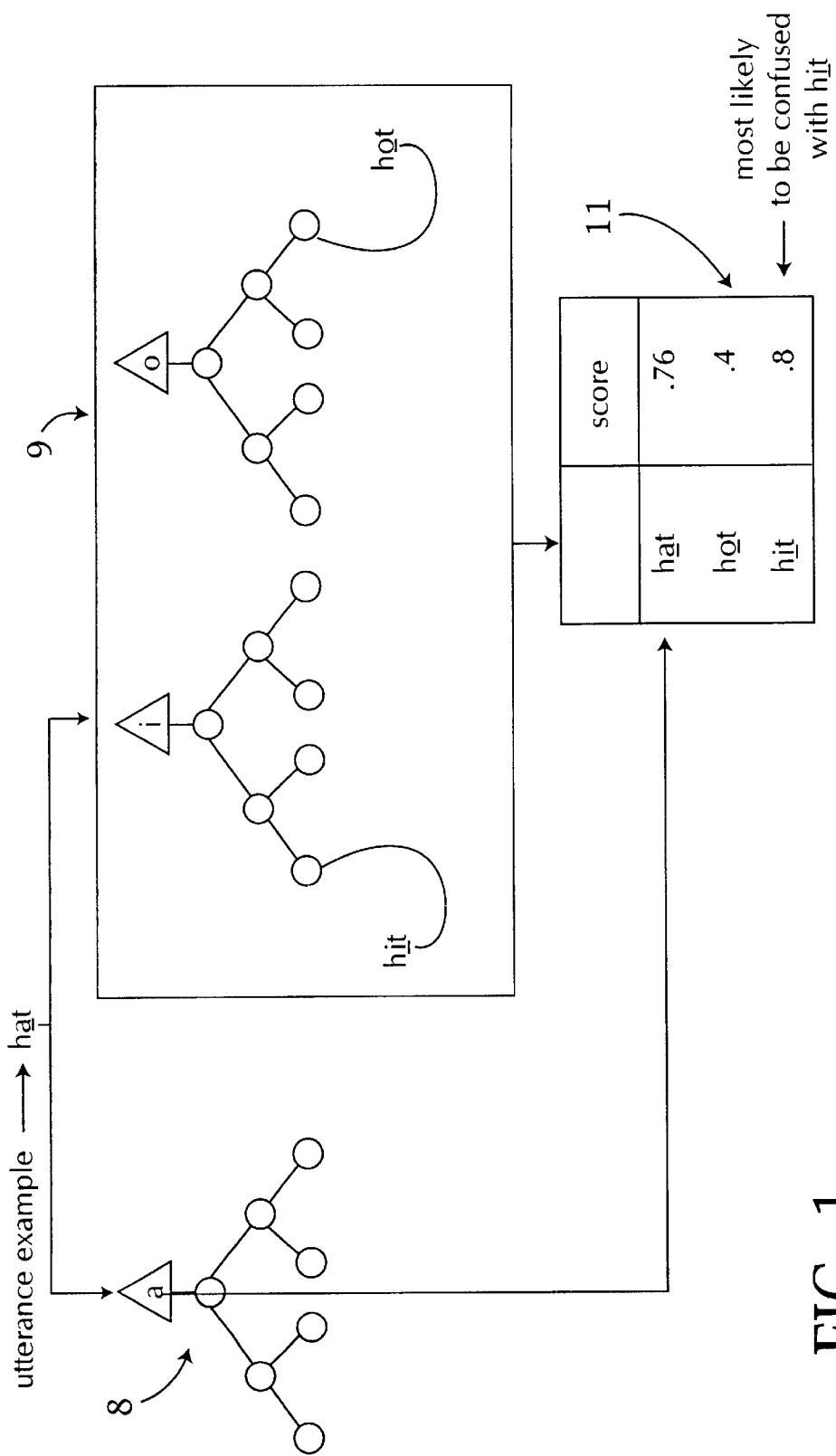
FIG. 1 illustrates the confusability assessment technique of the inventions.

The invention provides a powerful technique for assessing confusability. The technique can be implemented using allophone trees to select among various speech models used by a speech recognizer. Once confusability has been assessed using the techniques described, the resulting confusability data can be further used in a variety of ways. Several are discussed here and others are possible.

One use of the confusability assessment techniques involves a further inventive technique which we call "military training."

Another use of the confusability assessment technique is in confusability rejection systems; a third use is in forming or defining sound unit clusters for speech recognition.

The following will first describe allophone trees and their construction and use. Then the confusability assessment technique will be described. Finally several examples of the confusability technique will be given, including our military training technique for constructing allophone trees. If the vocabulary of a speech recognition system is very small and fixed, one can train a speech model for each of the words that will be recognized by the system. For example, to build a system that recognizes spoken letters of the alphabet, one could train a model, typically a Hidden Markov Model (HMM), for the letter 'a', another for the letter 'b' and so on. However, state of the art speech recognition systems that have vocabularies of more than about 100 words are typically based on phonemes or other fundamental sound units for a given language (e.g., syllables).

When word models composed of phoneme submodels of this type were first used, the construction of a word HMM was done in a very simple way. For instance, to build an HMM for the word "cat" (phoneme sequence: "k ae t") one simply put together models representing the phonemes 'k', 'ae' and 't'. However, phonemes are affected by the preceding and following phonemes; an 'ae' preceded by an 's' may sound quite different from an 'ae' preceded by 'k', so the 'ae' in "cat" may sound quite different from the 'ae' in "sat". These different forms of a phoneme, which depend on the surrounding phonemes are called allophones of the phoneme. State of the art systems for medium sized or large vocabularies currently have dozens or hundreds of allophone models for some phonemes.

The most common way of training allophone models in today's systems is to grow a decision tree for each phoneme model or for each state of the HMM for each phoneme model. A particular phoneme may be seen in thousands of different phonetic contexts and it is difficult for a human being to decide exactly how to define the allophone models for each phoneme. In the decision tree approach, a tree growing algorithm is provided with many examples of a phoneme in different contexts, have a set of yes/no questions about the context that may or may not be useful. Each example contains digitized information summarizing its acoustic properties. Some of the context questions will ask about the presence or absence of individual phonemes; some will ask about classes of phonemes, such as vowels or consonants, stops or fricatives. The tree growing algorithm will arrange these questions in a binary tree that will tend to separate examples of the phoneme that are acoustically dissimilar. For instance, the first question asked in the tree for 'ae' might be: "Is this 'ae' preceded by a consonant?" If the answer is "yes", the next question encountered might be "Is this 'ae' followed by the phoneme 'p'?"—and so on.

Once the tree for a phoneme or phoneme HMM state has been obtained, each example of the phoneme or phoneme HMM state can be assigned to a terminal node, usually called a leaf. Examples gathered together in a leaf are used to calculate an acoustic probability distribution. When sound produced by a new speaker over a short time frame is digitized, one can calculate the probability that it was produced by the probability distribution in a given leaf of the allophone tree for a given phoneme. Speech recognition consists of finding the most likely sequence of allophone tree leaves, given the set of words in the system dictionary and information about which word sequences are most probable.

The overall performance of a speech recognition system depends crucially on the accuracy of the allophone models: if they are poorly defined, the speech recognition system cannot possibly achieve good recognition performance. In particular, if the model is in the leaf node of a tree for a particular phoneme (e.g., 'ae') leads to a high probability for examples of another phoneme (e.g., 'ao' as in "k ao t"for the word "caught") then misrecognition will often occur (e.g., "cat" will be misrecognized as "caught").

Referring to FIG. 1, the confusability assessment technique of the invention may be used to identify, for a given example or utterance, those allophone models that are most likely to be confused with the provided example. In FIG. 1 the example utterance "hat" is submitted to the correct decision tree for the phoneme 'a' as at 8. It is also submitted to the other phoneme trees (i.e., the incorrect phoneme trees at 9). The resulting likelihood scores are calculated as at 11. Note that in this example, the allophone model for the phoneme 'i'—as in the word 'hit'—has a high likelihood score. In fact, in this example it has a higher likelihood score than the correct allophone model for the word "hat."

The system assesses the likelihood scores and selects those above a predetermined threshold as being likely to be confused with the example utterance. By way of example, if the predetermined threshold is set at 0.7, then any phoneme models generating likelihood scores above 0.7 will be marked as confusable with the example utterance. Thus, while in the illustration provided in FIG. 1, the most likely to be confused example had a score higher than the correct example, this is not a requirement. Rather, any example having a score higher than a predetermined threshold can be flagged as likely to generate confusion.

The confusability assessment technique of the invention provides a new way of growing allophone trees. The invention grows allophone trees discriminatively, thus minimizing the likelihood of such confusions. As will be more fully explained below, the system essentially assigns more weight to the most confusable examples in the training data—i.e., examples that are close to the acoustic boundary between two or more phonemes. Compared with trees grown by a conventional maximum likelihood (ML) approach, the effect of the invention is to create more acoustic probability distributions near phonemic boundaries, and fewer in the "interior" regions of the phoneme (where misrecognition is very unlikely). By analogy, the invention employs a "military style" approach to allophone tree growing; it places more emphasis on the confusable phonemic boundaries, just as a country with aggressive neighbors puts most of its troops near the frontiers.

Figure 2A:
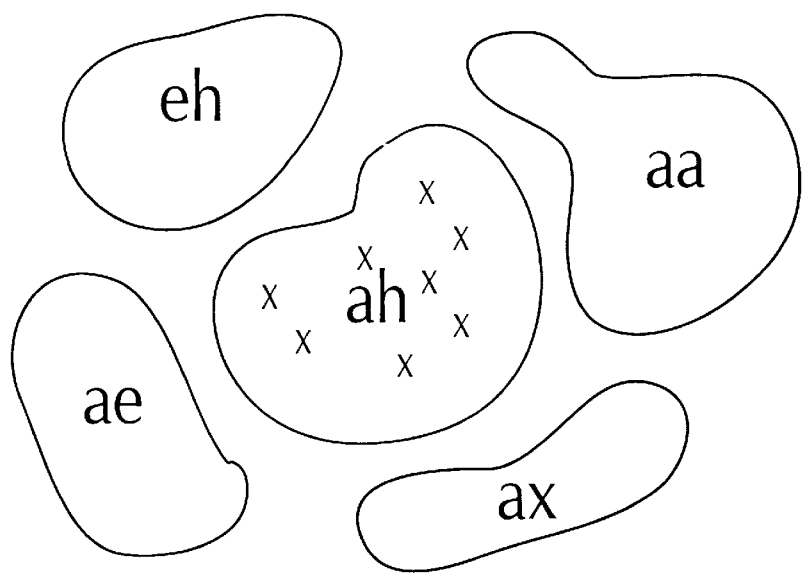
FIG. 2a and 2b compare conventional tree model training (FIG. 2a) with military style training of the invention (FIG. 2b)
Figure 2B:
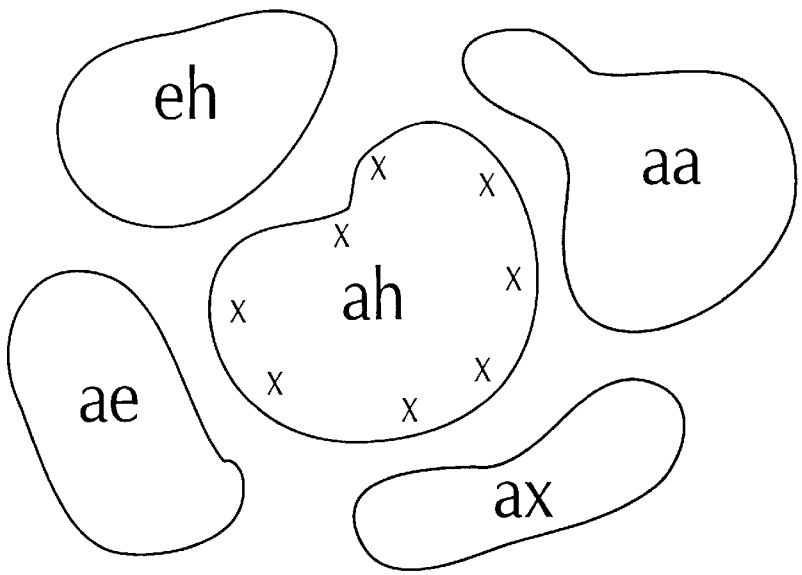

For a better understanding of the difference between military style training and conventional training see FIGS. 2a and 2b. FIG. 2a illustrates conventional training for the 'ah' tree model and FIG. 2b illustrates military style training for the 'ah' tree model. Note how the acoustic leaves (represented as x's) are distributed at the confusable phoneme boundaries when military style training is used.

Figure 3:
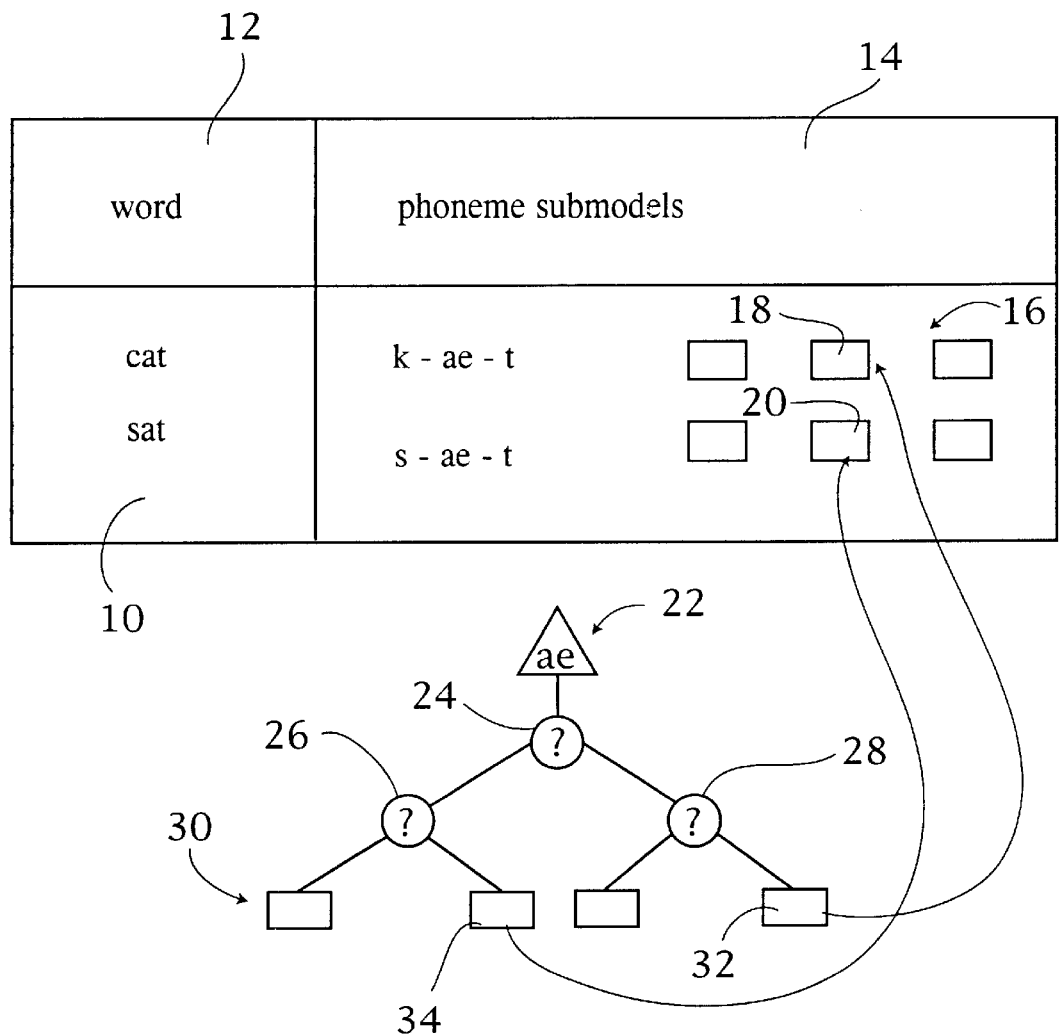
FIG. 3 is a phonemic representation of several words in a speech recognizer dictionary, diagrammatically showing how different allophones of a given phoneme may be identified using a decision tree.

To illustrate the concepts applicable to the present invention, FIG. 3 diagrammatically shows several exemplary words within a dictionary 10. Each word, listed in word column 12 has an associated string of phoneme submodels illustrated in column 14. More specifically, the exemplary dictionary shown in FIG. 3 includes the words "cat" and "sat." Associated with the word "cat" is the following phoneme submodel string: k-ae-t. Associated with the word "sat" is the string: s-ae-t. In a model-based recognizer, such as a Hidden Markov Model recognizer, each of the phoneme components is itself represented as a model that has been trained on speech examples supplied by a training speaker population. These models, or submodels, as they are called, are shown diagrammatically at 16. Specifically, the submodel for the phoneme 'ae' of "cat" is shown at 18. Similarly, the phoneme 'ae' for the word "sat" is shown at 20.

Although the respective words "cat" and "sat" are spelled using the same vowel 'a', the pronunciation of that vowel may differ because of the sounds that precede and follow. This is referred to as the context of the phoneme. As noted above, these different forms of a phoneme, called allophones, are typically represented by different models. This is done to allow the recognizer to distinguish one allophone from another.

In the early days of speech recognition, the triphone was developed to accommodate the contextual nature of the phoneme. A separate speech model was created for each possible left and right context for each phoneme. This resulted in a burdensome number of phoneme models, requiring the recognizer to store and analyze models for each phoneme in all possible contexts.

Decision tree technology reduces the number of phoneme models required, by placing the models with highest likelihood at the leaf nodes of a yes-no question and answer tree structure. The tree allows the recognizer to determine which model it should use for a particular phoneme, based upon the phoneme's context. Questions residing at the root and intermediate nodes of the tree cause the recognizer to examine the phoneme's context and ultimately select the model that best suits the current context.

An exemplary decision tree for the phoneme 'ae' is shown at 22. The decision tree comprises a series of question nodes (root node 24 and intermediate nodes 26 and 28 are illustrated here). Each question is answered either yes or no, and the recognizer branches to the yes or no child node depending on the answer. At the extremity or leaf node positions lie the trained speech models for the phoneme in different contexts. Thus the leaf nodes, shown generally at 30, each represent a different allophone of the given phoneme. In FIG. 1, the allophone corresponding to phoneme submodel 18 (the 'a' in "cat") is pictured diagrammatically at 32; the model used to represent phoneme submodel 20 (the 'a' in "sat") appears at 34.

In a speech recognition system based on decision trees, there will typically be a decision tree, like the one illustrated at 22, for every phoneme required to represent the words in the dictionary (or there may be a decision tree for each state of the HMM for the phoneme). The present invention optimizes these decision trees so that they do a better job of discriminating among confusable phonemes.

Figure 4:
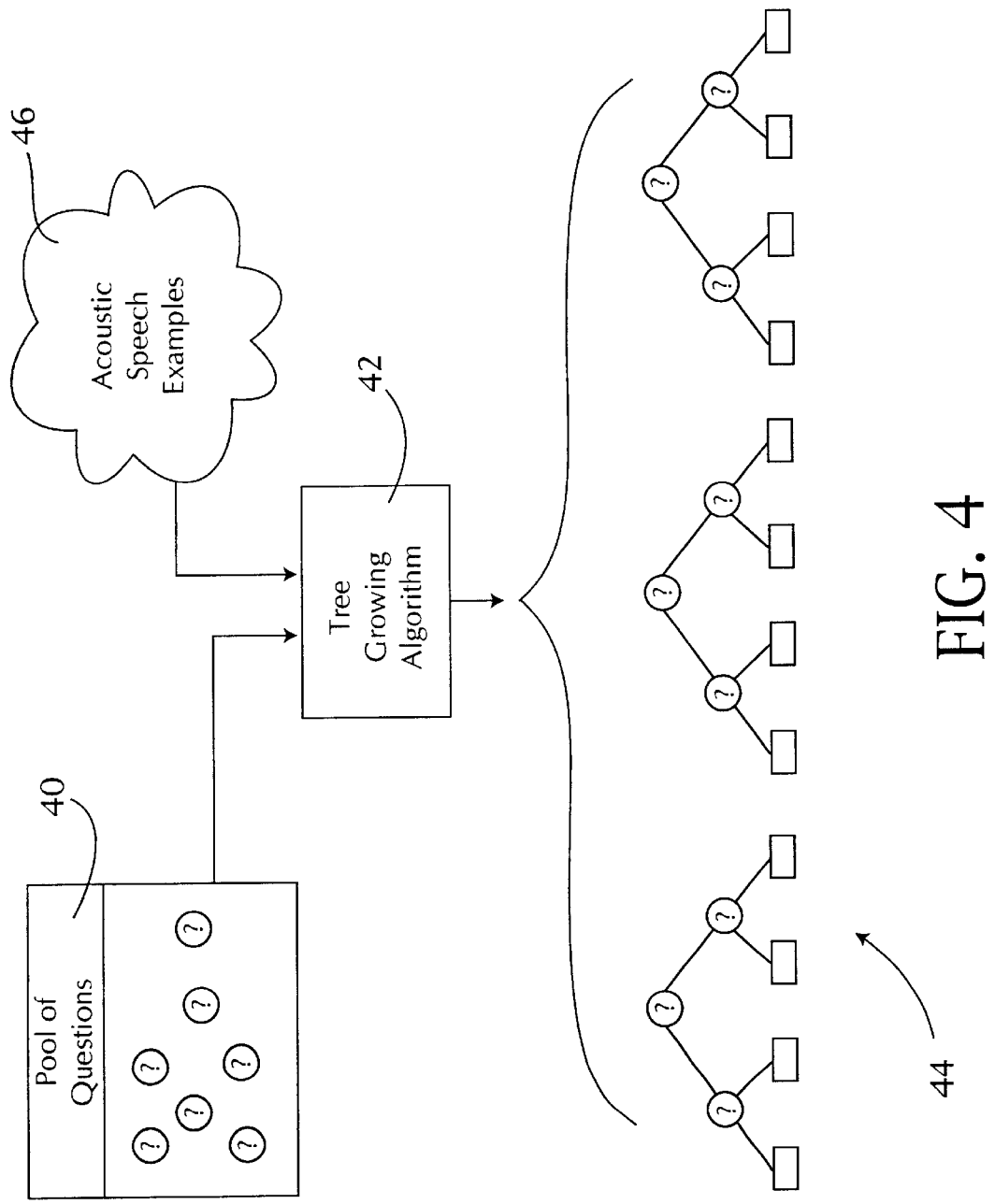
FIG. 4 is a data flow diagram illustrating in a simplified manner the technique for growing allophone decision trees.

The basic process for generating a set of decision trees is shown in FIG. 4. The system developer supplies a pool of questions 40 that are calculated or devised to discriminate among different phoneme contexts. These questions may include, for example, whether a given phoneme is preceded or followed by a particular other phoneme or group of phonemes. This pool of questions serves as one constituent of the raw material supplied the tree growing algorithm mechanism 42 that ultimately builds the decision trees 44.

In addition to the pool of questions, the tree growing algorithm is also supplied with a corpus of acoustic speech examples 46. These are labeled instances of speech featuring phonemes in different possible contexts. In a typical corpus of speech examples, there might be dozens or even hundreds of examples of each phoneme, in different contexts. These examples are labeled, meaning that the identity of the phonemes and their relevant context is known to the tree growing algorithm.

The tree growing algorithm, through an iterative process, tests each of the questions in the pool 40 and for each node selects the question that will best satisfy a predetermined criterion. Traditionally, the tree growing algorithm uses a maximum likelihood, entropy, or Gini criterion, which tends to result in yes and no children at each node that are as acoustically different from each other as possible. Thus the tree growing algorithm selects questions that will optimally separate the allophone models. Formally stated, the conventional tree growing algorithm uses a maximum likelihood estimation (MLE) approach as follows: To grow a tree for state i of phoneme one supplies a large number of examples generated by this state of P. Each such example, called a "data item," consists of summary statistics (the Gaussian means and variances associated with that realization of state i of P) plus information about the preceding and following phonemes. Each time a binary question (yes-no) is being evaluated at a node in the tree, one generates a "yes" Gaussian model from the data items that answer "yes" to the question, a "no" Gaussian model from the data items that answer "no", and then calculates the likelihood that the "yes" items were generated by the "yes" model and that the "no" items were generated by the "no" model. The question with the highest likelihood wins.

As will be more fully explained below, the present invention employs the foregoing maximum likelihood estimation approach at the outset, to construct a preliminary set of models that are used to access phoneme confusability. The phoneme confusability data is then used as an input to a tree growing algorithm that is designed to enforce the different criterion of minimizing confusability across all of the phoneme models. This process is illustrated in FIG. 5.

Figure 5A:
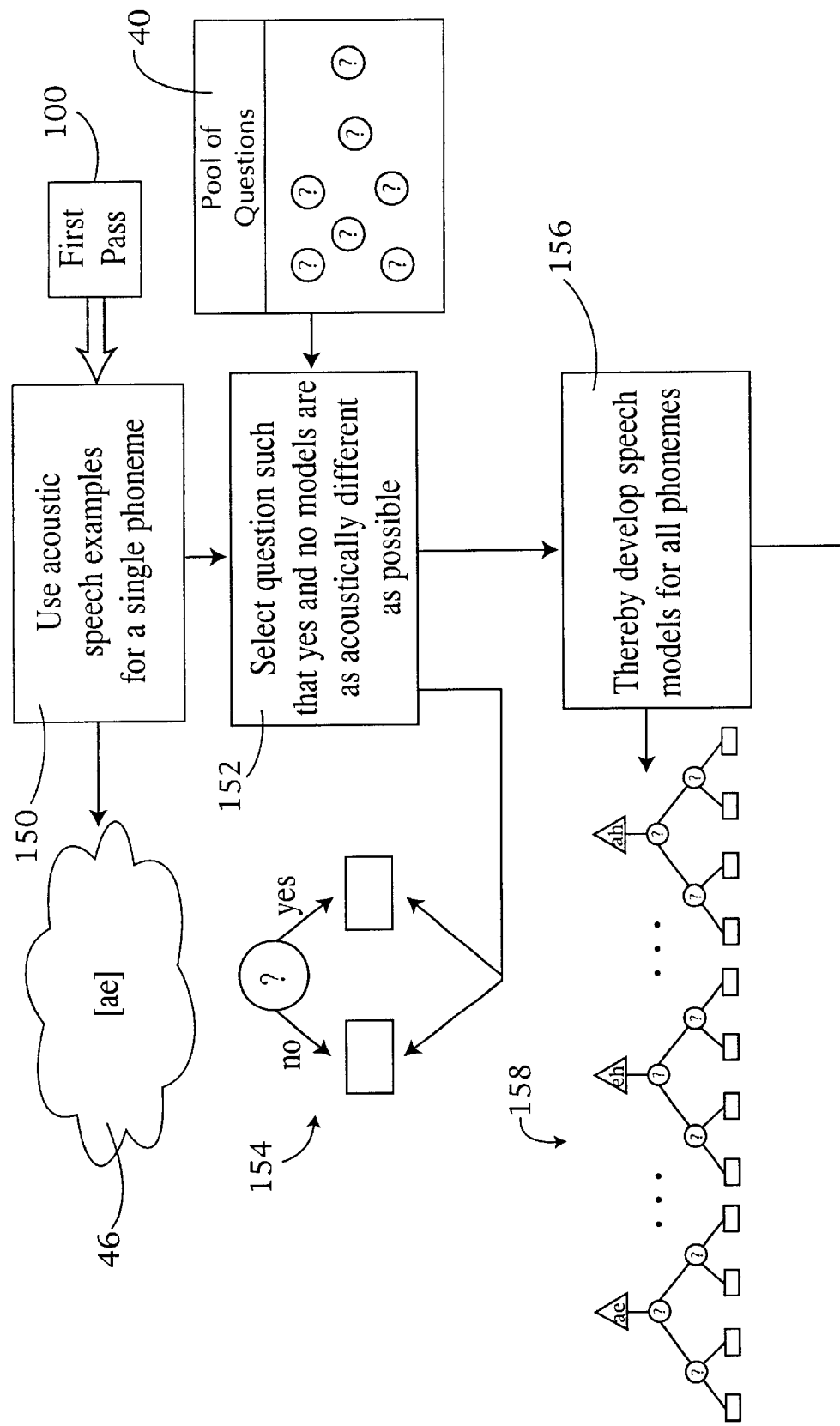
FIGS. 5a–5c (collectively referred to as FIG. 5) is a flow chart showing the presently preferred discriminative tree training system and method.
Figure 5B:
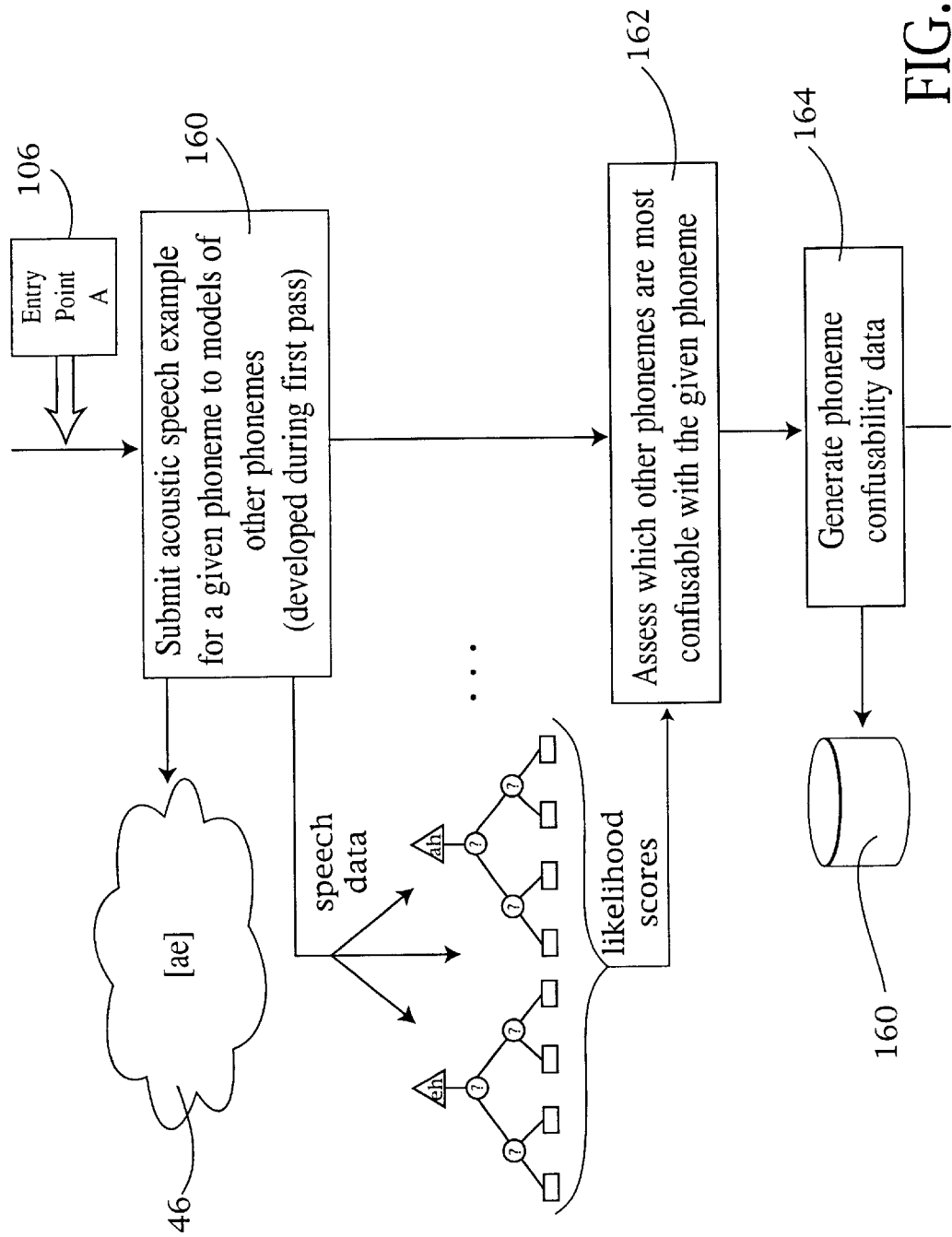
Figure 5C:
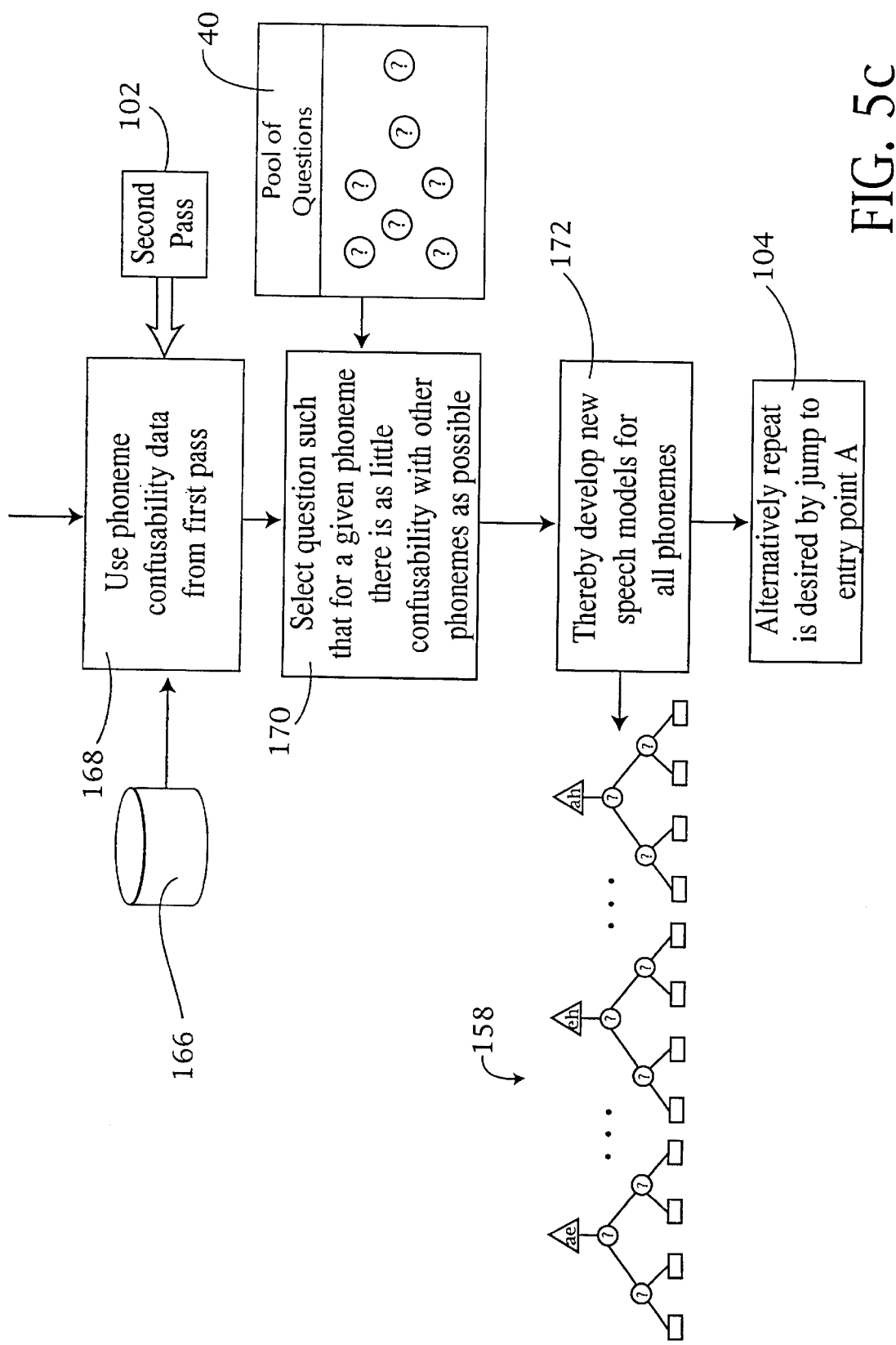

Referring to FIG. 5 (FIGS. 5*a*–5*c*), the presently preferred embodiment may be implemented as a multi-pass tree growing procedure. In FIG. 5, a first pass is illustrated commencing at 100; the second pass commences at 102, following completion of first pass 100. If desired, the second pass can be iteratively repeated by jump at the end of second pass 102 (step 104) into entry point A (step 106). As will be more fully explained, the first pass commences with a tree growing procedure that maximizes likelihood, and thus tends to make the leaf nodes of an individual phoneme tree as acoustically different as possible. Thus the first pass concentrates on developing individual phoneme decision trees. The second pass grows new decision trees that are optimized to minimize confusability among phonemes. Thus the second pass builds phoneme trees based on the additional information obtained from the first pass about which phonemes are most confusable.

Pass one begins at step 150. At step 150 acoustic speech examples 46 are selected for each phoneme. Illustrated here, the 'ae' phoneme is selected. Thus all acoustic speech examples containing the selected phoneme are used to generate a decision tree.

Next, at step 152 the pool of questions 40 is drawn upon by the tree growing algorithm. Each question is tested against the maximum likelihood criterion. Thus, as illustrated at 154, the no branch and the yes branch of the given question each point to speech models that tend to be acoustically quite different.

As indicated at step 156, the above procedure is repeated for each phoneme until decision trees are constructed for all phonemes represented in the dictionary. Illustrated in FIG. 5 are three such decision trees (at 158) for the phonemes 'ae', 'eh', and 'ah'. Of course, in a complete implementation, models for all phonemes would be present at this point.

Some of the phonemes may be confused with one another in certain contexts. The discriminative training technique of the invention is designed to identify these confusability situations and to discriminatively grow decision trees that minimize the likelihood of confusion.

In the presently preferred embodiment, confusability of phonemes is assessed, as explained above in connection with FIG. 1, by submitting acoustic speech examples for a given phoneme to the speech models of other phonemes (step 160), to see which speech models are most likely to be confused. Thus the acoustic speech data for the phoneme 'ae' is drawn from the corpus of acoustic speech examples 46 and supplied to the phoneme models developed for other phonemes during the first pass. By way of illustration, the acoustic speech example for 'ae' may be submitted to the speech models for 'eh' and 'ah'.

When acoustic speech data is analyzed by a speech model, the model yields a likelihood score, indicative of the probability that the given model generated the acoustic speech example. Some of the 'eh' or 'ah' models may generate relatively high likelihood scores when tested against the acoustic speech data for phoneme 'ae'. This indicates that these models are more likely to be confused by the 'ae' phoneme. In contrast, other models may generate low likelihood scores. This indicates that those models would not likely be confused by the acoustic speech data for the 'ae ' phoneme.

In step 162 the most dangerous competing phoneme is predicted for each example by comparing likelihood scores. Alternatively the likelihood scores may be accessed to determine which phonemes are most confusable with each other. The results obtained are used at 164 to generate a data store 166 of confusability data.

Once the confusability data has been generated, second pass 102 commences at step 168. In this pass, phoneme confusability data from the first pass (contained in data store 166) is used at step 170 to select questions from the pool 40 such that for a given phoneme there is as little confusability with other phonemes as possible.

The procedure is repeated for each phoneme at 172 until a new set of speech models for all phonemes has been developed. If desired, a second pass can be iteratively repeated, as indicated at 104, by jumping or looping back to entry point 106.

Note that whereas the first pass strives to optimize the predictive ability of the models for each individual phoneme separately; the second pass strives to optimize the models to improve discriminative ability across the entire set of models for all phonemes. In other words, the first pass concentrates locally on a single phoneme at a time, whereas the second pass concentrates more globally on discriminating against models for competing phonemes from the prior pass.

Let U be the model for a given acoustic unit (e.g., a phoneme or phoneme state); let Y (U) (abbreviated Y) be the acoustic observations from the training examples for that unit. The standard MLE criterion is to maximize P(Y|U), the probability of the acoustic observations given the model.

In the military approach, one maximizes $$p(U|Y)=p(Y|U)*p(U)/p(Y).$$

Now, taking the sum over all possible units (phonemes) U', we have $$p(Y) = \sum_{U'} p(Y|U')*p(U').$$

This can be rewritten as $$p(Y|U)*p(U) + \sum_{U' \neq U} p(Y|U')*p(U').$$

Thus, $$p(U|Y) = p(Y|U)*p(U) \bigg/ [p(Y|U)*p(U) + \sum_{U' \neq U} p(Y|U')*p(U')].$$

Finally, dividing top and bottom of the right-hand fraction by p(U), we see that we wish to maximize $$p(U|Y) = p(Y|U) \bigg/ [p(Y|U) + (1/p(U))* \sum_{U' \neq U} p(Y|U')*p(U')].$$

In our approach, the term $$(1/P(U)) \times \sum_{U' \neq U} p(Y|U')*p(U')$$

is calculated for each training example before growing the tree. This term, the "confusion coefficient", measures the danger that observation Y belonging to unit U is misrecognized. For a given wrong unit U', this danger is proportional both to p(Y|U') (the probability that U' generated the acoustic observation Y) and to the a priori probability p(U'). The effect of the confusion coefficient is to assign higher importance to examples of U that are likely to be misrecognized than to other examples of U. Our heuristic for estimating the confusion coefficient for an example of a phoneme, which has been previously described, requires context-dependent acoustic models for competing phonemes. We use a set of MLE models to get started, then iterate.

To do discriminative training, we therefore:

1. Obtain good context-dependent acoustic models using MLE
2. For each data item with summary statistics Y and true unit U, calculate its confusion coefficient C(Y(U)) using the equation $$C(Y(U)) = (1/p(U))* \sum_{U' \neq U} p(Y|U)*p(U')$$

where the models p(Y|U) come from the previous step
3. When choosing questions for a node and when pruning a tree, maximize the criterion $$\prod_Y p(Y|U)/[p(Y|U)+C(Y(U))]$$

4. Return to step 2 and iterate.

The confusability assessment technique of the invention can also be employed in a system for handling rejection, such as an out-of-vocabulary recognition system. The out-of-vocabulary problem arises when the user utters a word or sentence that is not found in the lexicon. Ideally, the system should not "find" the utterance in the lexicon, but merely return with a prompt to the user to repeat the utterance. However, if the out-of-vocabulary word generates a sufficiently high likelihood score, then the recognizer may incorrectly "find" the word or sentence in the lexicon.

To address this problem, the confusability assessment technique of the invention may be used. When the user utters a word or sentence, the recognizer returns the top scoring word or sentence found in the lexicon. That word or sentence will typically represent a string of phonemes or other sound units corresponding to the lexicon entry. Each of these phonemes (or other sound units) in the string is tested using the confusability assessment technique of the invention. If one or more phonemes in the string have a low likelihood as compared with other competing phonemes then the "recognized" word is rejected as being out of vocabulary.

By way of example, if the recognizer returns as the most likely word the name "Brian," the system tests each phoneme in the string to determine for each phoneme in the string what the likelihood of competing phonemes was. Thus for the given utterance if the likelihood is high that the first phoneme was a 'p' then it is likely that the recognizer has incorrectly responded to a word that is not in the lexicon.

The confusability assessment technique can also be used to generate sound unit clusters for speech recognition systems. In some speech recognition applications it may not be necessary for the recognizer to separately recognize all phonemes in the language. For example, in recognition systems designed to route telephone calls to the proper party, it may be sufficient if the recognizer is able to distinguish only among different classes of phonemes. By constructing the recognizer to discriminate among classes of phonemes (as opposed to individual phonemes), the recognizer can be made considerably smaller and thus more economical.

The confusability assessment technique described above can be used to create these phoneme clusters. Clusters are formed by grouping together all examples that are most highly confusable with one another. Then, using these clustered examples, the recognizer can be constructed so that it well discriminates between clusters, but does not expend computational effort in discriminating among members of the same cluster. In this way, a very compact set of models can be constructed.

From the foregoing, it will be seen that the system and method of the invention are well adapted to assess confusability in a variety of phoneme-based applications. It will of course be appreciated that the techniques described here are applicable to sound units other than phonemes. For example, the techniques can equally be applied to recognizers that use syllables (as opposed to phonemes) or entire words as the basic sound unit. Thus while the invention has been described in its presently preferred form, it will be understood that the invention is capable of modification without departing from the spirit of the invention as set forth in the appended claims.

What is claimed is:

1. A method for training a set of speech model decision trees comprising:

a) constructing a first set of decision trees for a plurality of sound units such that each decision tree references at least two speech models;

b) testing speech models associated with the first set of decision trees to identify sound units that are confused by said speech models and thereby generating a set of confusability data; and c) constructing a second set of decision trees for said plurality of sound units by using confusability data generated by said step(b) from said first set of decision trees as an input to a tree growing algorithm to select questions such that the probability that a speech model for a first sound unit is confused by a second sound unit is minimized, wherein said first and second set of decision trees being adapted to receive a frame input and generate a probability of said frame input corresponding to a given one of said sound units.

2. The method of claim 1 wherein among said first and second set of decision trees only said first set of decision trees is constructed by selecting questions for a given sound unit such that the maximum likelihood criterion, the entropy criterion, or the Gini criterion is satisfied.

3. The method of claim 1 wherein said testing step is performed by supplying an example of speech to the speech models for at least one sound unit that is known not to represent said speech example and determining the likelihood that said speech models would generate said example of speech.

4. The method of claim 1 further comprising iteratively repeating steps b) and c).

5. The method of claim 1 wherein said sound units are phonemes and wherein said speech models represent different allophones of a given phoneme.

6. The method of claim 1 wherein said second set of decision trees is constructed such that greater discrimination among sound units is provided for those sound units that have a predetermined high probability of confusing said speech models.

7. The method of claim 1 wherein said second set of decision trees is constructed using information about a first sound unit in constructing the decision tree for a second sound unit.

8. The method of claim 1 wherein said sound units are phoneme Hidden Markov Model (HMM) states.

9. The method of claim 1 wherein the confusability data is indicative of one or more speech models and sound units that are confused by the one or more speech models.

10. A method for training a set of speech model decision trees, comprising:

constructing a first set of decision trees for a plurality of sound units such that each decision tree references at least two speech models;

submitting acoustic speech samples for known sound units to speech models of other sound units, where the speech models are associated with the first set of decision trees;

identifying sound units that are confused by said speech models, thereby generating a set of confusability data; and constructing a second set of decision trees for said plurality of sound units using said confusability data and the first set of decision trees generated by said step of identifying as an input to a tree growing algorithm to select questions such that the probability that a speech model for a given sound unit is confused by a different sound unit is minimized, wherein said first and second set of decision trees being adapted to receive a frame input and generate a probability of said frame input corresponding to a given one of said sound units.

11. A method for training a set of speech model decision trees comprising:

a) constructing a first set of decision trees for a plurality of sound units such that each decision tree references at least two speech models;

b) testing speech models associated with the first set of decision trees to identify sound units that are confused by said speech models and thereby generating a set of confusability data; and c) constructing a second set of decision trees for said plurality of sound units by using confusability data as an input to a tree growing algorithm to select questions such that the probability that a speech model for a first sound unit is confused by a second sound unit is minimized, wherein the confusability data is indicative of one or more speech models and sound units that are confused by the one or more speech models, selecting questions for the second set of decision trees by maximizing the criterion $$\prod_Y p(Y|U)/[p(Y|U)+C(Y(U))]$$

where p(Y|U) is the probability of an acoustic observation, Y, given its speech model, U, and C(Y(U)) is a measure that the acoustic observation, Y, belonging to its speech model, U, is misrecognized.

12. The method of claim 10 further comprises calculating a confusion coefficient, C(Y(U)), as follows $$C(Y(U)) = (1/p(U)) * \sum_{U' \neq U} p(Y|U) * p(U').$$

13. A method for training a set of speech model decision trees, comprising:

constructing a first set of decision trees for a plurality of sound units, each decision tree corresponds to a given sound unit and references at least two speech models for the given sound unit, such that an acoustic speech sample input to a decision tree generates a likelihood score that the acoustic speech sample is the applicable sound unit;

submitting acoustic speech samples for known sound units to speech models of other sound units;

identifying sound units that are confused by said speech models, thereby generating a set of confusability data; and constructing a second set of decision trees for said plurality of sound units using said confusability data generated by said step of identifying from said first set of decision trees as an input to a tree growing algorithm to select questions such that the probability that a speech model for a given sound unit is confused by a different sound unit is minimized, wherein said first and second set of decision trees being adapted to receive a frame input and generate a probability of said frame input corresponding to a given one of said sound units.

* * * * *

UNITED STATES PATENT AND TRADEMARK OFFICE
CERTIFICATE OF CORRECTION

PATENT NO. : 6,711,541 B1
DATED : March 23, 2004
INVENTOR(S) : Kuhn et al.

It is certified that error appears in the above-identified patent and that said Letters Patent is hereby corrected as shown below:

Column 9,
Line, 3, after "models" insert -- ,said first set of decision trees referencing questions from a set of binary questions --.
Line 5, after "trees" insert -- with a set of acoustic speech examples respective to each given sound unit --.
Line 6, delete "generating" and insert -- to generate --.
Line 7, after "data" insert -- having, for each given sound unit in said plurality of sound units, at least one competitive sound unit to said given sound unit for each acoustic speech example respective to that given sound unit --.
Line 9, after "using" insert -- said set of --.
Lines 10-11, delete "generated by said step (b) from said first set of decision trees" and insert -- and said set of binary questions --.
Line 11, delete "an input" and insert -- inputs --.
Line 11, delete "to select" and insert -- which establishes an independent tree in said second set of decision trees for each sound unit said independent tree organizing --.
Line 12, after "questions" insert -- from said set of binary questions to maximize the criterion $$\prod_Y p(Y|U)/[p(Y|U) + C(Y(U))]$$

where p(Y|U) is the probability of an acoustic observation, Y, given its speech model, U, and C(Y(U)) is a measure that the acoustic observation, Y, belonging to its speech model, U, is misrecognized --.
Line 12, delete "such" and insert -- so --.
Line 12, after "probability" insert -- is minimized --.
Line 14, delete "is minimized".
Line 14, delete "set" and insert -- sets --.
Line 15, delete "being" and insert -- are --.
Line 15, after "input" insert -- from a sound produced by a speaker over a short time frame --.
Line 16, after "and" insert -- to --.
Line 53, after "models" insert -- , said first set of decision trees referencing questions from a set of binary questions --.
Line 57, after "trees" insert -- , so that a set of acoustic speech samples is submitted to each given sound unit --.
Line 59, after "data" insert -- having, for each given sound unit in said plurality of sound units, at least one competitive sound unit to said given sound unit for each acoustic speech sample respective to that given sound unit --.

UNITED STATES PATENT AND TRADEMARK OFFICE
CERTIFICATE OF CORRECTION

PATENT NO. : 6,711,541 B1
DATED : March 23, 2004
INVENTOR(S) : Kuhn et al.

It is certified that error appears in the above-identified patent and that said Letters Patent is hereby corrected as shown below:

Column 9 (cont'd),
Line 62, after "said" insert -- set of --.
Line 65, after "questions" insert -- from said set of binary questions --.

Column 10,
Line 1, after "minimized" insert -- by maximizing the criterion $$\prod_Y p(Y|U)/[p(Y|U) + C(Y(U))]$$

where p(Y|U) is the probability of an acoustic observation, Y, given its speech model, U, and C(Y(U)) is a measure that the acoustic observation, Y, belonging to its speech model, U, is misrecognized --.
Line 2, delete "set" and insert -- sets --.
Line 2, delete "being" and insert -- are --.
Line 3, after "input" insert -- from a sound produced by a speaker over a short time frame --.
Line 3, after "and" insert -- to --.
Line 12, delete "generating" and insert -- generate --.
Line 21, after "models" insert -- and by --.
Line 34, delete "comprises" and insert -- comprising --.
Line 35, delete "a confusion coefficient" and insert -- said measure --.
Line 44, delete "corresponds" and insert -- corresponding --.
Line 45, delete "references" and insert -- referencing --.
Line 49, after "unit" insert -- , said first set of decision trees referencing questions from a set of binary questions --.
Line 56, after "using" insert -- said set of binary questions and --.
Line 56, after "said" insert -- set of --.
Line 58, delete "an input" and insert -- inputs --.
Line 59, after "questions" insert -- from said set of binary questions --.
Line 61, after "minimized" insert -- by maximizing the criterion $$\prod_Y p(Y|U)/[p(Y|U) + C(Y(U))]$$

where p(Y|U) is the probability of an acoustic observation, Y, given its speech model, U, and C(Y(U)) is a measure that the acoustic observation, Y, belonging to its speech model, U, is misrecognized --.

UNITED STATES PATENT AND TRADEMARK OFFICE
CERTIFICATE OF CORRECTION

PATENT NO.   : 6,711,541 B1
DATED        : March 23, 2004
INVENTOR(S)  : Kuhn et al.

It is certified that error appears in the above-identified patent and that said Letters Patent is hereby corrected as shown below:

Column 10 (cont'd),
Line 62, delete "set" and insert -- sets --.
Line 62, delete "being" and insert -- are --.
Line 63, after "input" insert -- from a sound produced by a speaker over a short time frame --.
Line 63, after "and" insert -- to --.

Signed and Sealed this

Eighth Day of November, 2005

JON W. DUDAS
*Director of the United States Patent and Trademark Office*